POLYESTER RESIN CASTING PROPERTIES

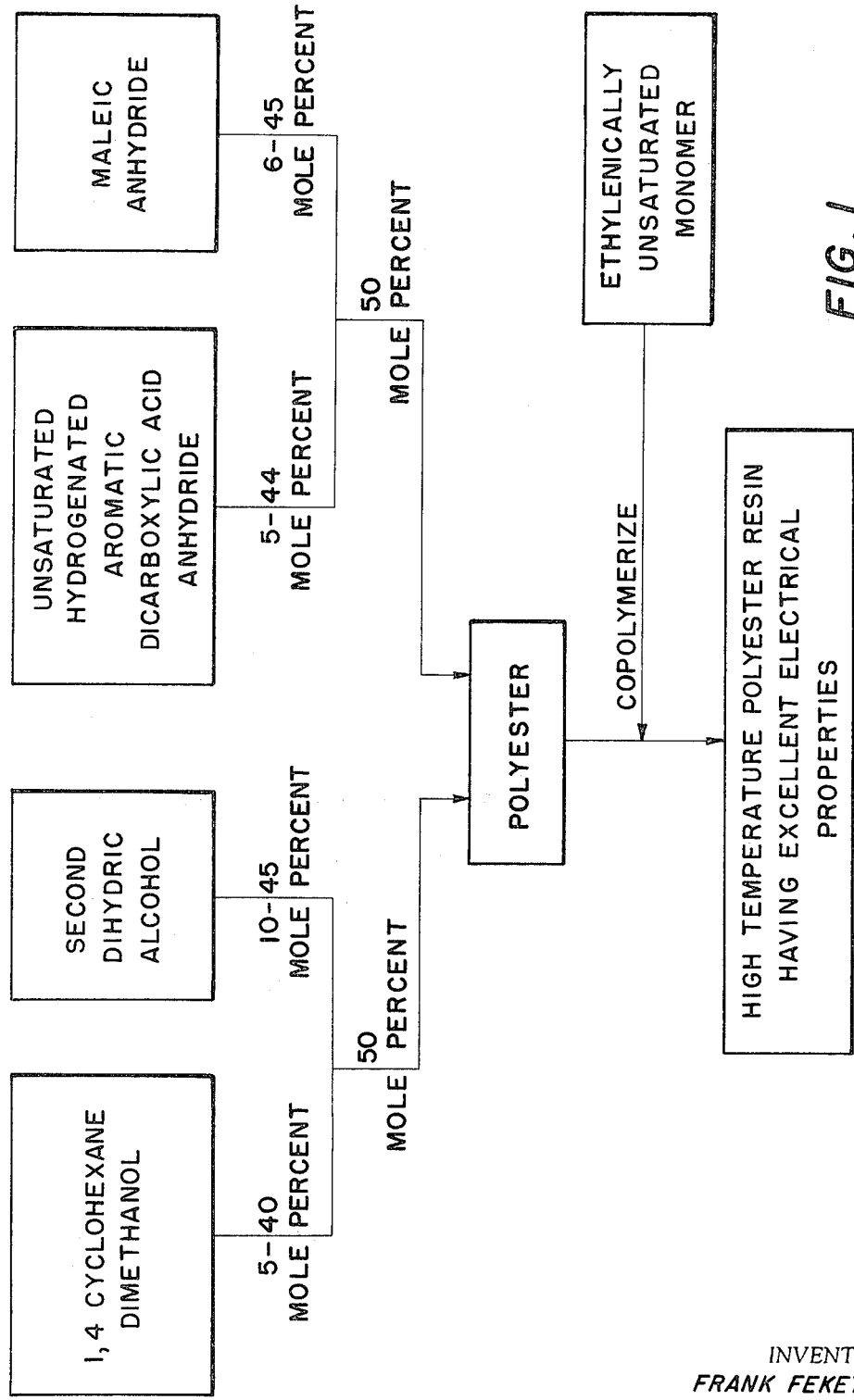

| | 40% STYRENE[1] | 55% STYRENE[1] | 40% VINYL TOLUENE[2] | 55% VINYL TOLUENE[2] |
|---|---|---|---|---|
| IZOD IMPACT | 0.75 | 0.85 | 0.67 | 0.80 |
| TENSILE STRENGTH | 6–8,000 | 5–7,000 | 6–8,000 | 5–7,000 |
| MODULUS x $10^{-6}$ | 0.47 | 0.50 | 0.51 | 0.48 |
| % ELONGATION | 0.84 | 0.89 | 0.76 | 0.75 |
| FLEXURAL STRENGTH | 15–17,000 | 13–15,000 | 15–17,000 | 13–15,000 |
| MODULUS x 10 | 0.49 | 0.48 | 0.50 | 0.45 |
| HEAT DISTORTION TEMP., °F | 275 | 281 | 275 | 260 |
| BARCOL HARDNESS | 47 | 45 | 47 | 47 |
| % $H_2O$ ABSORPTION, 24 HRS. ROOM TEMP. | 0.23 | 0.20 | 0.19 | 0.15 |
| THERMAL RESISTANCE (% WEIGHT LOSS) 8 DAYS, 220 °C | 3.3 | 3.2 | 1.0 | 1.0 |

1) CURED WITH 3/4 % BENZOYL PEROXIDE CATALYST FOR 2 HRS. AT 75°C AND 2 HRS. AT 135°C.

2) CURED WITH 3/4 % 2,5-DIMETHYLCYCLOHEXANE-2,5-DIPEROCTOATE CATALYST FOR 2 HRS. AT 60°C; 1 HR. AT 75°C AND 2 HRS. AT 135°C.

FIG. 2

VOLUME, SURFACE RESISTIVITY AND ARC RESISTANCE OF POLYESTER RESIN
(CLEAR CASTINGS)

| | | ASTM D257 | | ASTM D495 |
|---|---|---|---|---|
| % MONOMER | CURE | OHM-CM, VOL. RESISTIVITY | OHM, SURFACE RESISTIVITY | AVERAGE ARC RESISTANCE, SEC. |
| 40 VINYL TOLUENE | AS MOLDED | > $0.795 \times 10^{16}$ | > $0.275 \times 10^{16}$ | 95.5 |
| 40 VINYL TOLUENE | POST CURED | $0.621 \times 10^{16}$ | > $0.275 \times 10^{16}$ | — |
| 40 STYRENE | AS MOLDED | $0.318 \times 10^{16}$ | $0.220 \times 10^{16}$ | 106 |
| 40 STYRENE | POST CURED | $0.650 \times 10^{16}$ | > $0.275 \times 10^{16}$ | — |
| 55 VINYL TOLUENE | POST CURED | $0.588 \times 10^{16}$ | > $0.275 \times 10^{16}$ | 80.0 |

FIG. 5

VOLUME FACTOR & DIELECTRIC CONSTANT PROPERTIES OF POLYESTER RESIN AT 23°C
(CLEAR CASTING)

| | | | ASTM D150 | | |
|---|---|---|---|---|---|
| % MONOMER | CURE | FREQUENCY (CYCLES) | DISSIPATION FACTOR | % POWER FACTOR | DIELECTRIC CONSTANT |
| 40 VINYL TOLUENE | AS MOLDED | 100 | .0047 | 0.47 | 4.01 |
| 40 VINYL TOLUENE | POST CURED | 100 | .0050 | 0.50 | 3.40 |
| | | 1000 | .0060 | 0.60 | 3.38 |
| 40 STYRENE | AS MOLDED | 100 | .0043 | 0.43 | 4.05 |
| 40 STYRENE | POST CURED | 100 | .0052 | 0.52 | 3.44 |
| | | 1000 | .0062 | 0.62 | 3.40 |

FIG. 6

INVENTORS
FRANK FEKETE &
JOHN S. McNALLY
BY John P. Taylor
their Attorney

ELECTRICAL PROPERTIES
(GLASS FIBER LAMINATES OF POLYESTER IN 40% VINYL TOLUENE)

| ASTM TEST NUMBER | | AS MOLDED | POSTCURED | AGED |
|---|---|---|---|---|
| D257 | VOLUME RESISTIVITY | $1.45 \times 10^{15}$ OHMS/CM. | $1.40 \times 10^{15}$ OHMS/CM. | $4.14 \times 10^{14}$ OHMS/CM. |
| D257 | SURFACE RESISTIVITY | $1.54 \times 10^{14}$ OHMS | $1.65 \times 10^{14}$ OHMS | $4.95 \times 10^{13}$ OHMS |
| D257 | INSULATION RESISTANCE | $1.27 \times 10^{14}$ OHMS | $2.1 \times 10^{13}$ OHMS | $1.02 \times 10^{13}$ OHMS |
| D150 | DISSIPATION FACTOR | .0120 | .0086 | .0155 |
| D150 | POWER FACTOR | 1.20% | 0.89% | 1.55% |
| D150 | DIELECTRIC CONSTANT | 4.35 | 4.37 | 4.38 |

FIG. 7

TRACK RESISTANCE OF POLYESTER RESIN INCLINED PLANE TEST METHOD

| % MONOMER | % FILLER | % GLASS MAT | ASTM D2303 TRACK RESISTANCE (IN MIN.) |
|---|---|---|---|
| 40 VINYL TOLUENE | — | — | >1,000 |
| 40 VINYL TOLUENE | 50 SILICA FLOUR | — | >850 |
| 40 VINYL TOLUENE | 33 McNAMEE CLAY | 33 | >450 |
| 40 STYRENE | — | — | >1,000 |

FIG. 8

CHEMICAL RESISTANCE OF POLYESTER COPOLYMERIZED WITH 50% BY WEIGHT STYRENE
IMMERSED IN SOLUTIONS AT 99°C FOR 1 MONTH

| CHEMICAL | FLEXURAL STRENGTH PSI | % RETENTION | FLEXURAL MODULUS PSI | % RETENTION | % CHANGE IN WEIGHT |
|---|---|---|---|---|---|
| BEFORE IMMERSION | 14,647 | | 437,000 | | |
| 25% ACETIC ACID | 2254 | 15 | 307,000 | 70 | +2.9 |
| 5% SODIUM HYDROXIDE | 9665 | 66 | 428,000 | 98 | +0.62 |
| 10% SODIUM HYDROXIDE | 7720 | 53 | 441,000 | 101 | +0.19 |
| AQUEOUS HYPOCLORITE SOLUTION (CLOROX BLEACH) | 12,639 | 86 | 417,000 | 96 | +0.83 |
| DISTILLED WATER | 11,569 | 79 | 423,000 | 97 | +0.84 |
| 5% COLLOIDAL METAL SOLUTION (ELECTROSOL) | 11,047 | 75 | 428,000 | 98 | +0.89 |
| 15% HYDROCHLORIC ACID | 8192 | 56 | 457,000 | 105 | +0.73 |
| 5% NITRIC ACID | 7661 | 52 | 418,000 | 98 | +0.19 |

*FIG. 9*

United States Patent Office 3,560,445
Patented Feb. 2, 1971

3,560,445
HIGH TEMPERATURE UNSATURATED POLYESTER
Frank Fekete, Monroeville, and John S. McNally, Arnold, Pa., assignors to Koppers Company, Inc., a corporation of Delaware
Filed June 5, 1967, Ser. No. 643,481
Int. Cl. C08f 21/02; C08g 17/10
U.S. Cl. 260—75
9 Claims

ABSTRACT OF THE DISCLOSURE

An unsaturated polyester, having excellent electrical and high temperature properties when copolymerized with a monomer such as styrene or vinyl toluene is formed by reacting 1,4-cyclohexane dimethanol and a second dihydric alcohol such as ethylene glycol or neopentyl gylcol with maleic anhydride and an unsaturated, hydrogenated aromatic dicarboxylic acid such as tetrahydrophthalic anhydride. The copolymerized polyester resin is useful in electrical applications as a replacement for wood, ceramics, and rubber materials or the like.

BACKGROUND OF THE INVENTION

Figure 3:
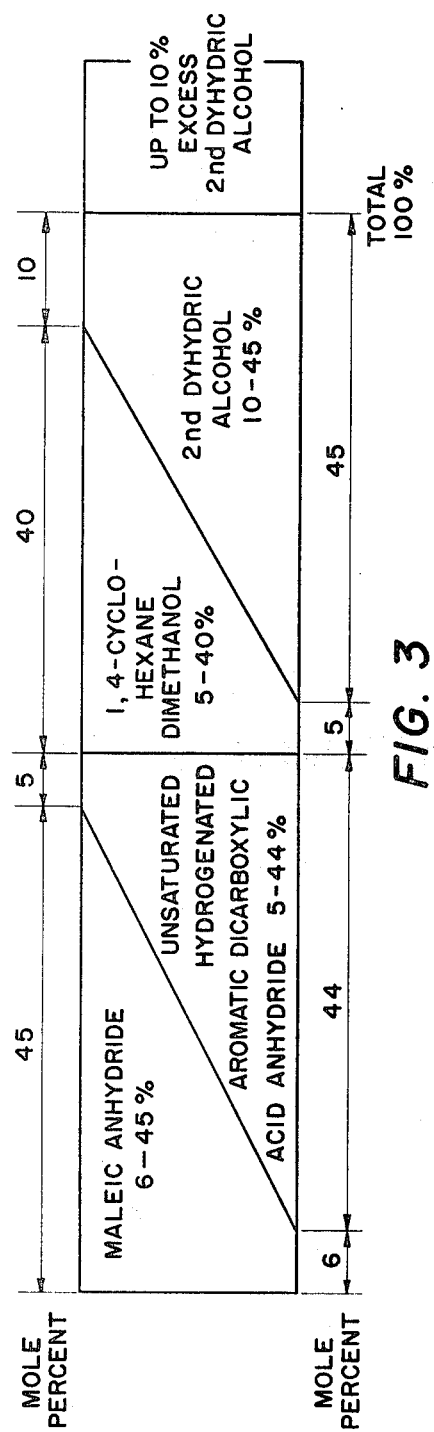

The electrical industry, due to current trends and changes in technology, has become an increasingly attractice market for plastic materials as replacements for conventional materials made of wood, ceramics, rubber and the like. For economic reasons, unsaturated polyesters (due to the large amounts of relatively inexpensive crosslinking monomers such as styrene used therein) appear to be the most desirable general purpose plastic materials for such markets. However, to effectively compete with presently used materials, the polyester must have good high temperature properties as well as good electrical and mechanical properties.

Unsaturated polyesters made with 1,4-cyclohexane dimethanol are known to possess superior electrical properties and heat distortion temperatures. However, when the dicarboxylic acid component is maleic anhydride, the resulting polyester is not completely soluble in ethylenically unsaturatd monomers such as styrene which are normally used as both solvent and copolymerizable monomers to cure or crosslink the polyester. A polyester made by condensing 1,4-cyclohexane dimethanol with maleic anhydride, when later mixed with styrene, results in an opaque two-phase system.

It has been suggested in the literature that this monomer incompatibility may be overcome by substituting phthalic anhydride for portions of the maleic anhydride. However, when amounts of phthalic anhydride, sufficient to achieve a monomer compatibility, are added, the resulting polyester, after being cured or crosslinked with the styrene is found to have excessive weight losses (thermal instability) when exposed to high temperatures (30% weight loss after 8 days at 220° C.) which is highly unsatisfactory in a resin specially prepared for exposure to high temperatures. The same problem arises, if, instead of replacing a portion of the maleic anhydride with phthalic anhydride, a portion of the 1,4-cyclohexane dimethanol is replaced by a more common dihydroxy alcohol such as ethylene glycol or neopentyl glycol, i.e. when amounts sufficient to achieve monomer compatibility are added, the weight loss or thermal stability is deleteriously affected.

It has also been found, if a polyester is made using 1,4-cyclohexane dimethanol reacted with a mixture of maleic anhydride and tetrahydrophthalic anhydride, that even small amounts of tetrahydrophthalic anhydride (1 mole per 3 moles maleic anhydride) while achieving some degree of monomer compatibility, causes a reduction of about 40° F. in heat distortion temperature. The use of larger amounts of tetrahydrophthalic anhydride, while achieving better monomer compatibility, results in catastrophic drops in heat distortion temperatures ($-100°$ F.) compared to the simple 1,4-cyclohexane dimethanol-maleic anhydride polyester. Much the same results are noted when the 1,4-cyclohexane dimethanol is omitted and another dihydric alcohol such as neopentyl glycol substituted therefore. Small amounts of tetrahydrophthalic substituted for maleic anhydride causes some loss of heat distortion temperature without achieving monomer compatibility while larger amounts achieve monomer compatibility at the expense of large drops in heat distortion.

SUMMARY OF THE INVENTION

Quite surprisingly, it has now been discovered that the combination of 1,4-cyclohexane dimethanol and a second dihydric alcohol, such as ethylene glycol or the like, polyesterified with a combination of maleic anhydride and an unsaturated hydrogenated aromatic dicarboxylic anhydride, such as tetrahydrophthalic anhydride, results in a polyester which, when crosslinked with an ethylenically unsaturated monomer such as styrene, has high thermal resistance, high heat distortion values, and excellent electrical properties, as well as good mechanical and chemical properties, without sacrificing monomer compatibility. This combination of properties was quite unexpected since the addition of tetrahydrophthalic anhydride (as mentioned above) to a 1,4-cyclohexane dimethanol-maleic anhydride polyester reduced the heat distortion temperature, while the substitution of a common dihydric alcohol had been found to lower the thermal stability of such a system.

In accordance with the invention, a polyester composition, soluble in an ethylenically unsaturated monomer, and which, when copolymerized with the monomer, is characterized by excellent high temperature and electrical properties, is formed by the esterification of dihydric alcohols and unsaturated dicarboxylic acid anhydrides:

(a) The dihydric alcohols consisting essentially of:
(1) 5–40 mole percent 1,4-cyclohexane dimethanol
(2) 10–45 mole percent of a second dihydric alcohol having the formula:

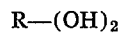

where R is an alkylene having from 2–6 carbon atoms, hydrogenated phenylene, hydrogenated biphenylene, or a hydrogenated bis-phenol of the following formula:

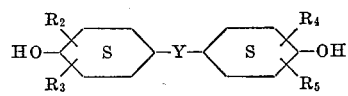

where $R_2$, $R_3$, $R_4$, $R_5$, are the same or different and are selected from the group consisting of hydrogen or lower alkyl, and Y is a lower alkylene;

the sum of the total mole percent of the dihydric alcohols being at least 50 mole percent of the total moles of dihydric alcohols and dicarboxylic acid anhydrides; and (b) The unsaturated dicarboxylic acid anhydrides consisting essentially of:

(1) 5–44 mole percent of an unsaturated, hydrogenated aromatic dicarboxylic acid anhydride; and
(2) 6–45 mole percent of maleic anhydride, the sum of the total mole percent of the dicarboxylic acid anhydrides in the polyester being 50 mole percent of the total moles of dihydric alcohols and dicarboxylic acid anhydrides, the sum of the mole percent of 1,4-cyclohexane dimethanol and the unsaturated hydrogenated aromatic dicarboxylic acid anhydride constituting at least 20 mole percent of the polyester.

DETAILED DESCRIPTION

The polyester of the invention is made by reacting equimolar amounts of dihydric alcohols and dicarboxylic acids or their anhydrides. The esterification reaction between a carboxylic acid and an alcohol to form an ester is given by the equation below:

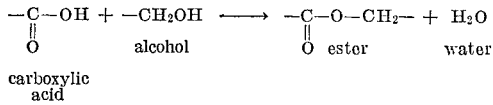

When difunctional molecules are used, i.e. dicarboxylic acids and dihydric alcohols, the ester will also have an hydroxyl end group and a carboxylic acid end group as illustrated below:

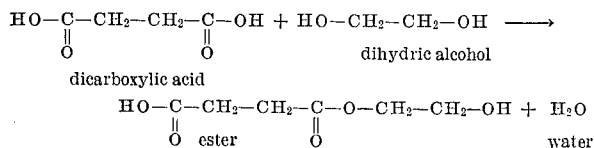

Each of these end groups are then available to repeat the esterification reaction illustrated above by reacting with more acid and more alcohol respectively. If all the acids and alcohols used as reactants be difunctional, the polyester molecule chains can be built to great length. However, the reaction is reversible and hence, the water formed must be removed. This is one of several practical limitations as to the size of the polyester molecule.

Another important consideration as to high molecular weight is the ratio of amounts of acid and alcohol used. If a large excess of either acid or alcohol is used, the growth of the polyester molecule may be inhibited, since the formation of the ester linkages is dependent upon the reaction of one acid group with one alcohol group. Therefore, the mole ratio of the dicarboxylic acids or their anhydrides to the dihydric alcohols in the polyester must be about one to one. However, due to the loss of some dihydric alcohol from the reactor by boiling off with the by-product water, which, as mentioned earlier, must be removed to allow the esterification reaction to proceed, about 10% by weight excess dihydric alcohol is usually charged to the reactor. The exact amount of excess dihydric alcohol used will depend somewhat upon the boiling points of the particular dihydric alcohol used. When a higher boiling dihydric alcohol is used, as the second dihydric alcohol, for example, 1,4-butanediol, B.P. 230° C. losses of dihydric alcohol during the esterification are minimal and the need for excess amounts is reduced. It should be noted that 1,4-cyclohexane dimethanol boils in a range of 284–288° C. depending upon the proportions of cis and trans isomers present. Therefore, dihydric alcohol losses and resultant need for excess dihydric alcohol during the esterification (which is carried on at temperatures generally in the range of 200–215° C. or below) are dependent upon the boiling point of the second dihydric alcohol.

1,4-cyclohexane dimethanol, as mentioned above, exists in two isomeric forms, cis and trans. Either isomer or mixtures thereof are suitable for use in the invention. The cis isomer has a boiling point of 288° C. and the trans isomer boils at 284° C. A typical mixture of 70% trans and 30% cis boils at 285° C. The 1,4-cyclohexane dimethanol in amounts of at least 5% of the total mole content of the polyester of the invention results in a polyester having excellent high temperature properties when cured with a cross-linking monomer such as styrene. However, when amounts above 40% of the total mole content of the polyester are used, the compatibility of the polyester with monomers such as styrene, which are used as solvents and cross-linking monomers for the polyester is reduced.

The second dihydric alcohol has the general formula: $R(OH)_2$ where R is alkylene having from 2–6 carbon atoms, hydrogenated phenylene, hydrogenated biphenylene, or a hydrogenated bisphenol of the following formula:

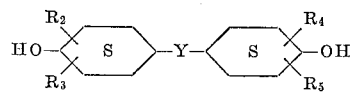

where $R_1$, $R_2$, $R_3$, $R_4$, are the same or different and are selected from the class consisting of hydrogen or lower alkyl, and Y is a lower alkylene.

Examples of such dihydric alcohols include ethylene glycol, 1,2-propanediol, 1,3-butanediol, 1,4-butanediol, 2,3-butanediol, 2,2′-dimethyl-1,3-propanediol, 1,3-cyclohexanediol, hydrogenated 2,2′-bis(4-hydroxyphenylene) propane, hydrogenated 2,2′-bis(4-hydroxy-3,5-dimethylphenylene) propane and the like. The amount of the second dihydric alcohol used in forming the polyester of the invention is from 10–45 mole percent. These limits are based on the amount of 1,4-cyclohexane dimethanol used since the total sum of all dihydric alcohols must equal at least 50 mole percent of the polyester (a slight excess of the dihydric alcohol is sometimes employed to compensate for losses as mentioned above).

The unsaturated, hydrogenated aromatic dicarboxylic acid anhydride comprises a dicarboxylic acid anhydride having an aromatic backbone which has been partially hydrogenated leaving one double bond in the ring. Examples of such dicarboxylic acid anhydrides include tetrahydrophthalic anhydride, endo-cis-bicyclo (2.2.1)-5-heptene-2,3-dicarboxylic acid anhydride having the formula:

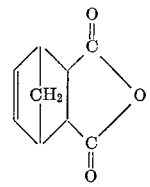

and alkyl substituted endo-cis-bicyclo (2.2.1)-5-heptene-2,3-dicarboxylic acid anhydrides having the formula:

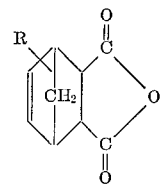

where R is lower alkyl.

In accordance with the invention, the unsaturated, hydrogenated aromatic dicarboxylic acid anhydride is used in amounts ranging from 5–44 mole percent of the polyester. The limitations placed upon the amount of this anhydride in the polyester of the invention are keyed to the high temperature properties desired as well as the cure time. As the amount of 1,4-cyclohexane dimethanol is decreased in the formulation, the amount of the unsaturated, hydrogenated aromatic dicarboxylic acid anhydride must be increased to maintain the high temperature properties. It has been found that the sum of the mole percent of 1,4-cyclohexane dimethanol and unsaturated hydrogenated aromatic dicarboxylic acid anhydride must be at least 20 mole percent to obtain such properties. However, the increasing of the amount of this anhydride and resulting reduction of the amount of maleic anhydride in the formulation results in lengthened curing times since the maleic double bond is much more reactive than that of the unsaturated, hydrogenated, aromatic dicarboxylic acid anhydride. Thus the use of lesser amounts of maleic anhydride, unless the curing time be extended, can result in less crosslinking and resulting reduction in hardness of the cured polyester resin. The maximum limitation on the amount of this anhydride useable in the polyester therefore reflects the minimum satisfactory hardness of the polyester. Polyesters formulated with more than 44 mole percent of the unsaturated, hydrogenated, aromatic dicarboxylic acid anhydride are too soft for high temperature applications.

The fourth component in the polyester is maleic anhydride. The term maleic anhydride is intended herein to embrace its isomeric counterpart fumaric acid and the use of the term anhydride as used throughout the description is intended to embrace both the acid and anhydride states of those dicarboxylic acids which can have anhydride states. In accordance with the invention, the maleic anhydride is present in a minimum amount of 6 mole percent to insure a minimum degree of hardness to the polyester as discussed above. The maximum amount of maleic anhydride useable is 45 mole percent of the total moles in the polyester. The amount, within these ranges, used is dependent upon the amount of unsaturated, hydrogenated, aromatic dicarboxylic acid anhydride present. The sum of the total moles of all the anhydrides in the polyester is 50 mole percent of the total moles in the polyester.

The polyester may be prepared in the presence of gelation inhibitors such as hydroquinone or the like, such as are well known in the art. Likewise, esterification catalysts well known in the art may also be used in the esterification.

The esterification is carried out under an inert blanket of gas such as nitrogen. The esterification is carried out in a temperature range of 180–220° C. for a period of about 6–20 hours until an acid number below 100 and preferably below 50 is obtained (based on milliequivalents of KOH necessary to neutralize 1 gram of the polyester).

The resulting polyester may be dissolved in and subsequently copolymerized with any of the well-known ethylenically unsaturated monomers use as solvents and copolymerizable monomers for polyesters. Examples of such monomers include styrene, alpha-methyl styrene, vinyl toluene, divinyl benzene, chlorostyrene, and the like as well as mixtures of the above monomers. The use of the term polyester herein is defined as the esterification product of dihydric alcohols and dicarboxylic acids or their anhydrides, while the term polyester resin is defined as a polyester dissolved in, or cross-linked with, a monomer such as described above.

In a preferred embodiment of the invention, the polyester, when subsequently copolymerized with an ethylenically unsaturated monomer such as styrene, has been found to have superior chemical resistance if the second dihydric alcohol used in the initial esterification be 2,2-dimethyl 1,3-propanediol (neopentyl glycol). When neopentyl glycol is used as the second dihydric alcohol the polyester resin withstands not only water and caustic attack for longer periods of time, but resists acid attack as well.

The following examples will serve to further illustrate the invention.

Example I

To a nitrogen purged reaction vessel was charged 2 moles of 1,4-cyclohexane dimethanol, 2.2 moles of ethylene glycol, 1 mole of tetrahydrophthalic anhydride and 3 moles of maleic anhydride. 200 p.p.m. of hydroquinone inhibitor was added and the temperature of the reaction vessel was raised to 190° C. and then maintained at 190–200° C. for 14 hours until the polyester reached an acid number of 27.

Weighed amounts of the polyester were added to sufficient amounts of liquid monomers of styrene and vinyl toluene respectively to provide solutions containing 40% by weight monomer 60% by weight polyester, and solutions containing 55% by weight monomer and 45% by weight polyester.

Castings were prepared from the solutions by adding ¾% by weight benzoyl peroxide catalyst to the styrene solutions and ¾% 2,5-dimethylhexane, 2,5-diperoctoate catalyst to the vinyl toluene solutions. The castings were then cured as indicated in FIG. 2, which tabulates various physical properties, including mechanical strengths and high temperature properties. The mechanical properties of the cured castings are comparable to other polyester resins while the heat distortion temperature and the thermal resistance are well above that of commonly known polyester resins. For example, a general-purpose polyester made by reacting 2 moles of ethylene glycol with 1 mole of phthalic anhydride and 1 mole of maleic anhydride would, when dissolved and cured in a 40% by weight styrene monomer solution, have a heat distortion temperature of about 200° F. The weight loss of such a polyester resin would exceed 50% after an 8-day exposure to a 220° C. temperature.

Figure 4:
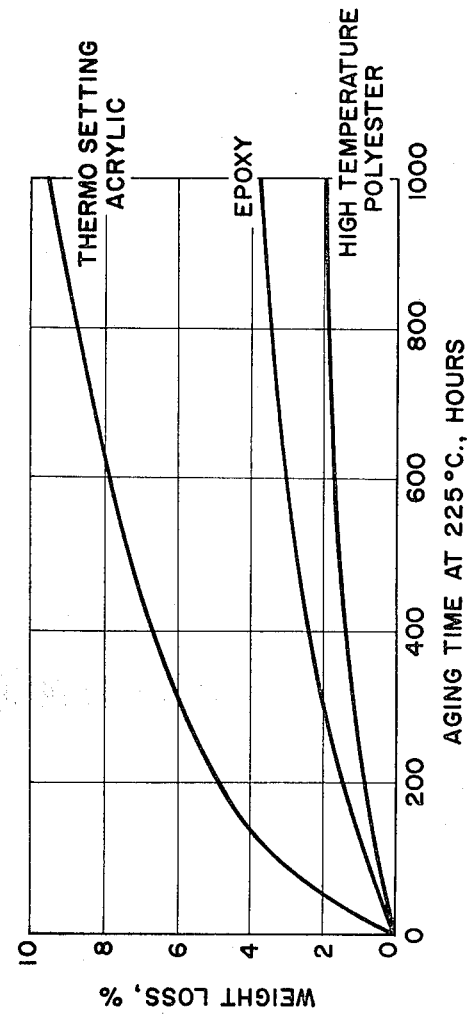

A further comparison of the percent weight loss or thermal stability of the polyester of the invention is seen by examining the graph of FIG. 4. The percent weight loss is plotted against hours for typical epoxy and thermosetting acrylic resins as well as the polyester resin of the invention. The results indicate the superior performance of the novel polyester of the invention.

Referring now to FIGS. 5–8, a number of electrical properties of the novel polyester were determined by subjecting the various castings obtained in Example I to various ASTM tests as indicated in the figures. The post-cured styrene castings referred to in FIGS. 5 and 6 were cured for 2 hours at 135° C. The post-cured vinyl toluene castings were cured for 2 hours at 60° C., 1 hour at 75° C., and 2 hours at 135° C. The resin systems were further modified in FIGS. 7–8 to indicate the effect of glass fiber and filler materials upon the electrical properties of the polyester. The post-cure referred to in FIG. 7 is the same as that for vinyl toluene in FIGS. 5–6. The aged column refers to exposure of the polyester laminate to a temperature of 220° C. for a period of at least 24 hours. The results of these tests indicate that the novel polyester resins of the invention have excellent electrical properties comparable to and in some instances better than any other thermosetting resin currently in use—including the more expensive epoxy resins. For example, conventional polyester resins have a volume resistivity of about $10^{14}$ ohm-cm. and epoxy resins about $10^{12}$–$10^{17}$ ohm-cm. The dielectric strength of a conventional polyester resin is about 180–300 volts per mil and epoxy resins are only about 350–400 volts per mil. The dissipation factor of a conventional polyester resin at 1 kilocycle may be as high as 0.16 while the dissipation factor of epoxy resin may be as high as 0.2.

Example II

Following the procedure of Example I, a polyester was prepared using the following ingredients:

2 moles 1,4-cyclohexane dimethanol
2.2 moles 2,2-dimethyl 1,3-propanediol
1 mole tetrahydrophthalic anhydride
3 moles maleic anhydride The esterification was carried out for 12 hours at 205° C. until an acid number of 25 was reached. The finished polyester was dissolved in sufficient monomeric styrene to provide a 50% by weight styrene, 50% polyester content.

The polyester resin was then copolymerized by the addition of ¾% by weight benzoyl peroxide catalyst and clear castings measuring 8″ x 8″ x ⅛″ were cast therefrom. The castings were cured for 2 hours at 75° C., and then for 2 hours at 135° C. The castings were then tested to determine their chemical resistance to acetic acid, 5% sodium hydroxide, 10% sodium hydroxide, aqueous hypochlorite (clorox bleach), distilled water, 5% colloidal metal solution (Electrosol), 15% hydrochloric acid and 5% nitric acid. In each case, the casting was immersed for thirty days in a solution heated to a temperature of 99° C. The results are tabulated in FIG. 9. These results are spectacular in comparison, for example, to a standard polyester resin consisting of a phthalic-maleic-ethylene glycol polyester copolymerized with styrene. Such a polyester disintegrates in distilled water at 99° C. within a week.

Example III

For purposes of comparison, a number of polyesters were prepared wherein one or more of the dicarboxylic acids or dihydroxy alcohols used in the polyester of the invention was omitted. In some instances, another acid was substituted for the omitted acid. All the polyesters were prepared following the procedures of Example I. 8″ x 8″ x 1/8″ castings were made in each case by diluting the polyester with 50% by weight styrene and copolymerizing the resin using 3/4% by weight benzoyl peroxide catalyst. The castings were cured for 2 hours at 75° C. followed by 2 hours at 135° C. The results are tabulated below:

biphenylene, or a hydrogenated bis-phenol of the following formula:

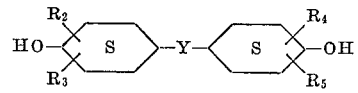

where $R_2$, $R_4$, $R_5$, are the same or different and are selected from the group consisting of hydrogen or lower alkyl, and Y is a lower alkylene; the sum of the total mole percent of the dihydric alcohols being at least 50 mole percent of the total moles of dihydric alcohols and dicarboxylic acid anhydrides; and (b) the unsaturated dicarboxylic acid anhydrides consisting essentially of:

(1) 5–44 mole percent of an unsaturated dicarboxylic acid anhydride selected from the group consisting of tetrahydrophthalic anhydride and endo-cis-bicyclo (2.2.1)-5-heptene-2,3-dicarboxylic acid; and

|  | Polyester | | | | | | | | | | | |
| --- | --- | --- | --- | --- | --- | --- | --- | --- | --- | --- | --- | --- |
| Mole Ratios | CHDM-MA 1:1 | CHDM-NPG-MA 1.8:2:2 | | CHDM-THPA-MA | | | NPG-THPA-MA | | | CHDM-NPG-PA-MA 2:2:1:3 | CHDM-NPG-THPA-MA 2:2:1:3 | CHDM-EG-THPA-MA 2:2:1:3 |
| | | | 1:1:2 | 4:1:3 | 4:2:2 | 4:3:1 | 4:1:3 | 4:2:2 | 4:3:1 | | | |
| Heat distortion temperature, °F | 260 | 260 | 260 | 216 | 167 | 140 | 256 | 186 | 132 | 266 | 275 | 276 |
| Percent weight loss 8 days at 220° C | 5.3 | 6.5 | 34 | 6.0 | 6.6 | 6.9 | 37 | 8.5 | 11 | 30 | 6.0 | 4.6 |
| Monomer compatibility | No | No | Yes | Yes | Yes | Yes | No | Yes | Yes | Yes | Yes | Yes |

NOTE: CHDM=1,4-cyclohexane dimethanol; MA=maleic acid; NPG=Neopentyl glycol; THPA=Tetrahydrophthalic anhydride; PA=Phthalic anhydride; EG=Ethylene glycol.

As previously mentioned, it can be seen that the addition of a third component to the 1,4-cyclohexane dimethanol-maleic anhydride polyester to achieve monomer compatibility results in either a lowering of the heat distortion temperature or a large increase in weight loss at elevated temperatures in every case in which the third component was present in sufficient quantity to achieve the desired monomer compatibility. The four-component system using phthalic anhydride has a high weight loss, thus rendering such a system unsatisfactory. In contrast, the polyesters made in accordance with the invention have a high heat distortion temperature with a low high temperature weight loss, yet are compatible with monomers such as styrene, vinyl toluene and the like.

Thus, the overall results of the tests conducted in the examples indicate that the resins formed using the polyesters of the invention have excellent electrical, mechanical, chemical and high temperature properties compared to conventional resins yet may be economically produced due to the large weight percent of the inexpensive ethylenically unsaturated monomer copolymerized with the polyesters.

What is claimed is:

1. A polyester composition soluble in an ethylenically unsaturated monomer selected from the class consisting of styrene, alpha-methyl styrene, vinyl toluene, divinyl benzene, and chloro-styrene, which when copolymerized with the monomer, is characterized by excellent high temperature and electrical properties formed by the esterification of dihydric alcohols and unsaturated dicarboxylic acid anhydrides:

(a) the dihydric alcohols consisting essentially of:

(1) 5–40 mole percent 1,4-cyclohexane dimethanol, (2) 10–45 mole percent of a second dihydric alcohol having the formula:

R—(OH)$_2$ where R is an alkylene having from 2–6 carbon atoms, hydrogenated phenylene, hydrogenated (2) 6–45 mole percent of maleic anhydride, the sum of the total mole percent of the dicarboxylic acid anhydrides in the polyester being 50 mole percent of the total moles of dihydric alcohols and dicarboxylic acid anhydrides;

the sum of the mole percent 1,4-cyclohexane dimethanol and the unsaturated dicarboxylic acid anhydride constituting at least 20 mole per cent of the polyester.

2. The polyester composition of claim 1 wherein said second dihydric alcohol is selected from the class consisting of ethylene glycol, 1,2-propanediol and 2,2'-dimethyl-1,3-propanediol.

3. The polyester composition of claim 1 wherein said second dihydric alcohol is ethylene glycol.

4. The polyester composition of claim 1 wherein said second dihydric alcohol is 2,2'-dimethyl-1,3-propanediol.

5. The polyester composition of claim 1 wherein said unsaturated dicarboxylic acid anhydride is tetrahydrophthalic anhydride.

6. The polyester composition of claim 1 wherein said second dihydric alcohol is 2,2'-dimethyl-1,3-propanediol and said unsaturated dicarboxylic acid anhydride is tetrahydrophthalic anhydride.

7. The polyester composition of claim 1 wherein said second dihydric alcohol is ethylene glycol and said unsaturated, hydrogenated aromatic dicarboxylic acid anhydride is tetrahydrophthalic anhydride.

8. A polyester composition soluble in an ethylenically unsaturated monomer selected from the class consisting of styrene, alpha-methyl styrene, vinyl toluene, divinyl benzene, and chloro-styrene, which when copolymerized with the monomer, is characterized by excellent high temperature and electrical properties and good chemical resistance formed by esterifying:

(a) 5–40 mole percent 1,4-cyclohexane dimethanol; and (b) 10–45 mole percent 2,2' - dimethyl-1,3-propanediol with (c) 5–44 mole percent tetrahydophthalic anhydride; and (d) 6-45 mole percent maleic anhydride, for a period of 6-20 hours at a temperature of 180-220° C. in an inert atmosphere until the polyester reaches an acid number below 100, the sum of the moles of the dihydric alcohols being at least 50 percent of the total moles within the polyester and the sum of the moles of 1,4-cyclohexane dimethanol and tetrahydrophthalic anhydride being at least 20 mole percent of the total moles within the polyester.

9. A polyester composition soluble in an ethylenically unsaturated monomer selected from the class consisting of styrene, alpha-methyl styrene, vinyl toluene, divinyl benzene, and chloro-styrene, which when copolymerized with the monomer, is characterized by excellent high temperature and electrical properties formed by esterifying:
  (a) 5-40 mole percent 1,4-cyclohexane dimethanol; and
  (b) 10-45 mole percent ethylene glycol with
  (c) 5-44 mole percent tetrahydrophthalic anhydride and
  (d) 6-45 mole percent maleic anhydride, for a period of 6-20 hours at a temperature of 180-220° C. in an inert atmosphere until the polyester reaches an acid number below 100, the sum of the moles of the dihydric alcohols being at least 50 percent of the total moles within the polyester and the sum of the moles of 1,4-cyclohexane dimethanol and the tetrahydrophthalic anhydride being at least 20 mole percent of the total moles within the polyester.

References Cited

UNITED STATES PATENTS 3,275,710  9/1966  Wooster _____ 260—863

FOREIGN PATENTS 6,400,444  7/1964  Netherlands.

OTHER REFERENCES

Boenig: Unsaturated Polyesters, Elsevier, New York, 1964, pp. 78-101 and 189 supplied.

Goodman et al.: Polyesters, vol. 1, Elsevier, New York, 1966, p. 8 supplied.

WILLIAM H. SHORT, Primary Examiner

M. GOLDSTEIN, Assistant Examiner

U.S. Cl. X.R.

260—861, 869, 871